Oct. 9, 1928.  1,687,181
T. B. PREASE
WIND MOTOR
Filed Feb. 24, 1927  4 Sheets-Sheet 1

Inventor
T. B. Prease.
By Lacey & Lacey, Attorneys

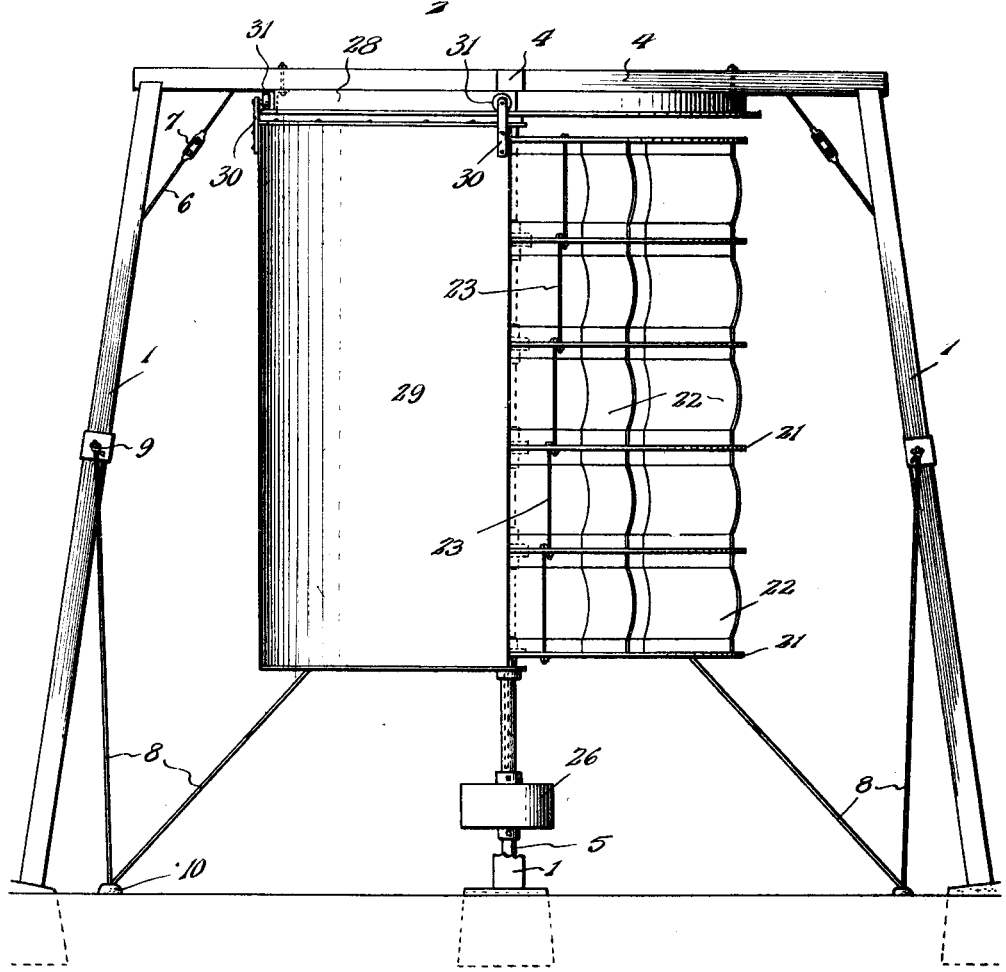

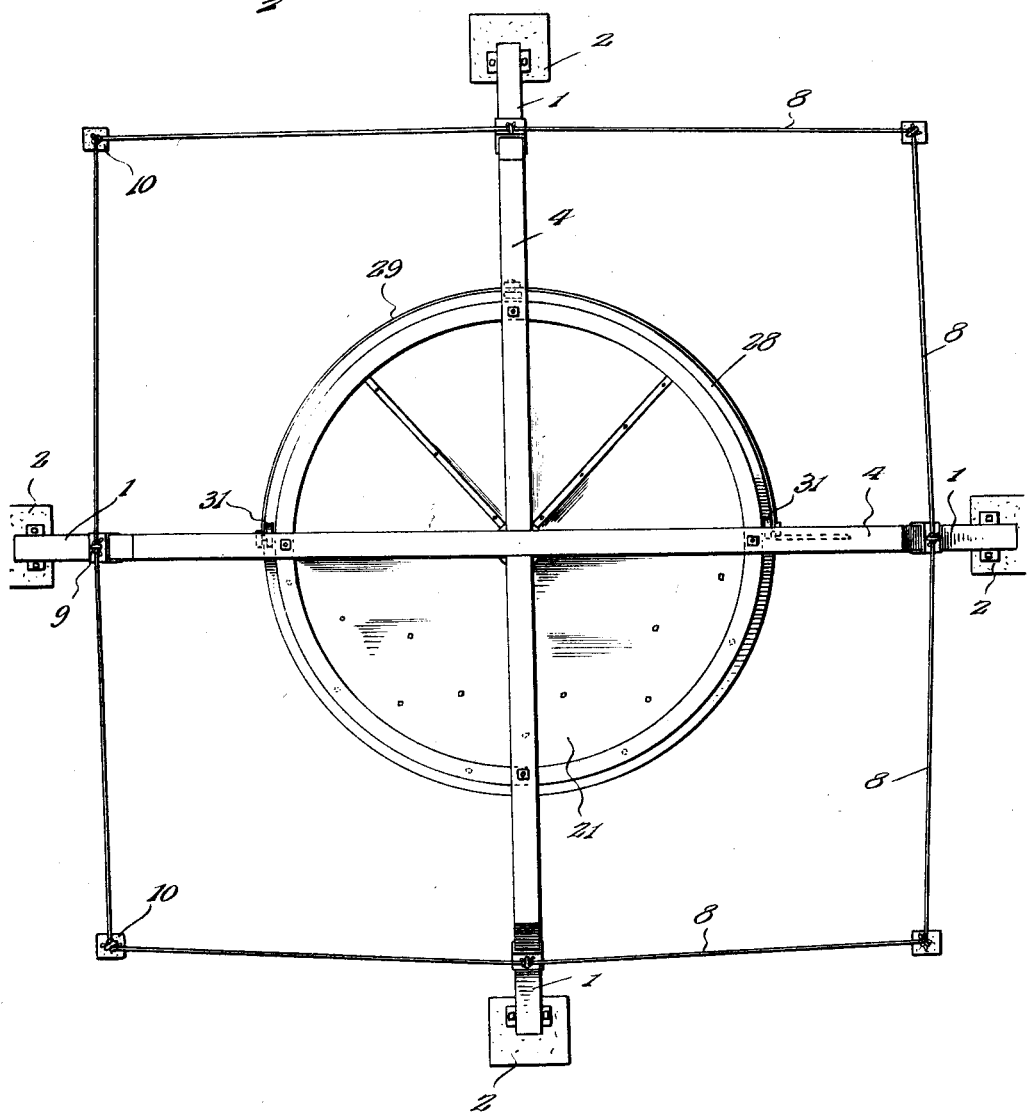

Oct. 9, 1928.
T. B. PREASE
1,687,181
WIND MOTOR
Filed Feb. 24, 1927    4 Sheets-Sheet 4
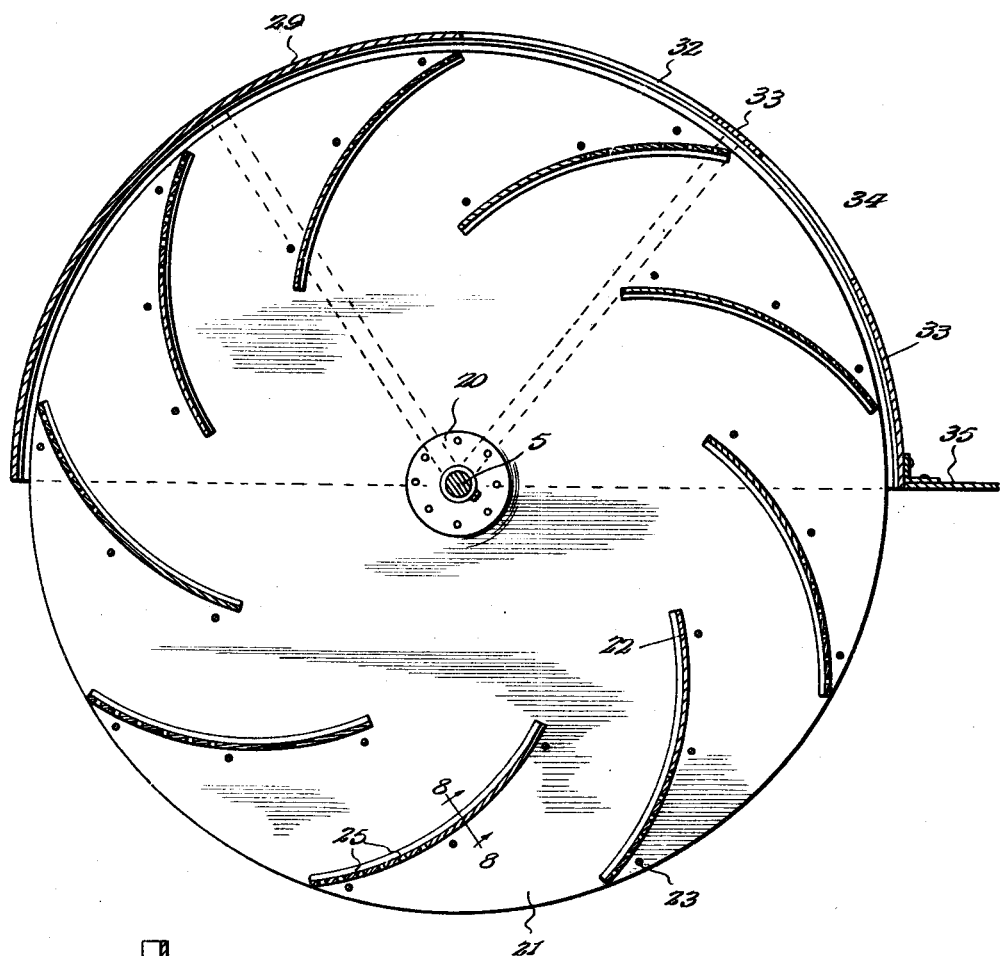

Patented Oct. 9, 1928.

1,687,181

UNITED STATES PATENT OFFICE.

THOMAS B. PREASE, OF SUPERIOR, ARIZONA.

WIND MOTOR.

Application filed February 24, 1927. Serial No. 170,603.

This invention relates to wind motors and has for its object the provision of a strong and durable apparatus which will withstand the action of high winds so as to develop power to drive machinery. The apparatus is intended more particularly for pumping water in arid regions but is, of course, capable of use wherever a cheap power is desired. The invention seeks to provide a wind driven motor which will be thoroughly braced and which will be so constructed and arranged that the air currents may be directed into the motor to propel the same and easily cut off therefrom when desired. The invention is illustrated in the accompanying drawings and consists in certain novel features which will be particularly pointed out in the appended claims.

In the drawings:

Fig. 2 is a similar view showing the shield shifted to cut off the wind from the motor;

Fig. 3 is a top plan view of the apparatus;

Fig. 4 is a section on the line 4—4 of Fig. 1;

Fig. 7 is a detail elevation of one of the blades;

Fig. 8 is a detail section of the blade.

Figure 1:
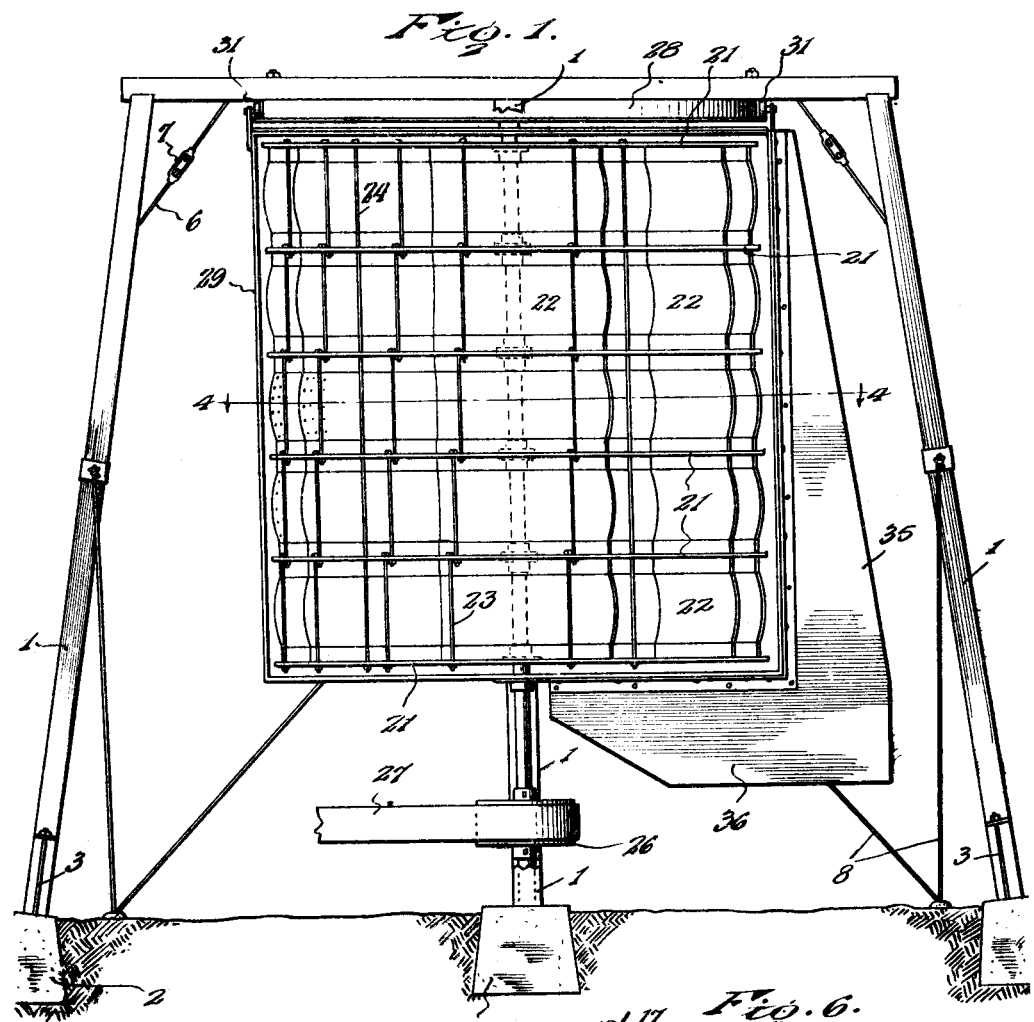
Figure 1 is a side elevation, partly broken away, of an apparatus embodying the invention.

In carrying out the invention, there is provided a plurality of posts 1 which are preferably arranged in rectangular relation and have their lower ends embedded in bases 2 of concrete whereby they will be firmly supported. Anchoring braces 3 may be secured to the lower ends of the posts and embedded in the concrete bases, as shown. The upper ends of the several posts are connected by beams 4 which extend at right angles to each other and intersect at the center of the area defined by the posts so as to support the upper end of the main driving shaft 5. The outer ends of the cross bars or beams 4 rest upon the upper ends of the posts 1 and are rigidly secured thereto by bolts or similar elements and are further reinforced by brace rods 6 disposed across the angles defined by the intersecting beams and posts and equipped with turnbuckles 7 whereby the desired tension may be put upon the rods. A very firm framework for the support of the driving shaft and the wind wheel is thus provided and further rigidity may be imparted to the frame by providing guy wires or ropes 8 secured each at one end to a post 1 at an intermediate point in the height of the same, as shown at 9, and having its lower end buried in or secured to a base or block 10 of cement which is embedded in the ground, as shown in Figs. 1, 2 and 3. These guy wires extend at right angles to the post to which they are attached and parallel with the respective beams so that the posts are braced in all directions.

Figure 5:
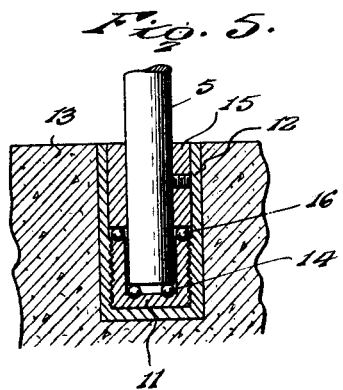
Fig. 5 is a detail sectional view of the bearing for the lower end of the main shaft.
Figure 6:
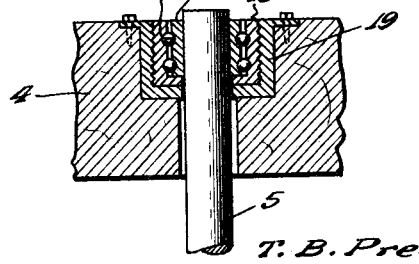
Fig. 6 is a similar view of the bearing for the upper end of the shaft.

The driving shaft 5 has its lower end carried by a step bearing which includes a cup 11 fitted in a socket 12 which is embedded in a concrete base 13, as shown most clearly in Fig. 5, bearing balls 14 being interposed between the bottom of the cup and the lower end of the shaft, as shown. A bushing 15 is secured to the lower end of the shaft above the cup 11 and bearing balls 16 are interposed between this bushing and the upper edge of the cup so that the shaft will be held in an upright position but will be free to revolve at all times. To the upper end of the shaft is secured a race ring 17 which cooperates with an outer race ring 18 secured in a thimble 19 which, in turn, is secured in the upper sides of the beams 4, bearing balls 19' being disposed between the two raceways so that the frictional resistance to the rotation of the shaft at the upper end of the same will be minimized.

To the upper portion of the shaft, I secure a plurality of vertically spaced collars or hub members 20, and to each of said collars I secure a disk or circular plate 21 which may be a single integral element but will preferably be made of sections rigidly secured together to facilitate the assembly of the parts. Any desired number of these disks or circular plates may be provided and I have found it advantageous to employ six plates which is the number illustrated in the drawings. Disposed between the several disks or circular plates are series of blades 22, each of which is disposed with its outer vertical edge at the periphery of the disks and its inner end disposed nearer the driving shaft but on a different radius of the disk, preferably the same radius which passes through the outer end of an adjacent blade. These blades are curved from end to end, as shown in Fig. 4, and between their upper and lower edges are also curved in a vertical direction, as shown in Fig. 8, and the upper and lower edges of the blades may be reinforced in any desired manner. The blades may be bolted or otherwise positively secured to the disks between which they are located and the disks are held in fixed relation to each other by bolts 23 inserted vertically therethrough and equipped with retaining nuts in an obvious manner. In assembling the wheel, the lowest disk is secured to the shaft and a series of blades then placed in position upon the disk after which a second disk is placed over the blades so as to rest thereon, the bolts 23 being then inserted, the disks being very securely clamped to the blades so as to hold them when the retaining nuts are turned home. This process is repeated until all the disks and blades have been assembled upon the driving shaft, and long bolts 24 are then inserted through the complete series of disks so that the entire structure will be formed into a rigid unit. As shown most clearly in Figs. 4 and 7, the outer end portions of the blades have openings 25 formed therethrough whereby the wind acting upon the blades will have a suction effect thereon which will aid the impact of the wind upon the inner portions of the blades so as to utilize the entire force of the wind to propel the wheel. Below the wheel a pulley 26 is secured to the driving shaft and a belt 27 is trained around this pulley so as to transmit the motion of the shaft to the machinery which is to be driven.

To the under side of the beams 4, I secure a circular track 28 concentric with the driving shaft. A shield 29 is provided having the form of an imperforate arcuate plate of a somewhat greater height than the wind wheel and provided at its upper end with brackets 30 carrying rollers 31 which run upon the track 28. The arcuate plate or shield 29 is disposed close to and concentric with the wheel and has a circumferential extent equal to about one-third or one-fourth of the circumferential area of the wheel, as shown most clearly in Fig. 4. Extending from one vertical edge of this shield is a frame or extension 32 which has vertical solid portions 33 and openings 34 alternating with said vertical portions so that the wind which enters the wheel will have an exit at one side of its main direction of travel to escape from the wheel after acting thereon. At a point directly diametrically opposite the free edge of the shield 29, a steering vane is provided, said vane consisting of a vertical member 35 disposed radially of and secured rigidly to the frame 32 and extending the full height thereof and a lower radial member 36 which projects under the wheel, as shown most clearly in Fig. 1. This steering vane or rudder serves to normally swing the shield 29 into the wind so that the force of the air currents will be cut off from one side of the wheel and will be free to act upon the blades at the opposite side thereof and, consequently, impart rotation to the wheel. It will be understood, of course, that, if the air currents were permitted to play over the entire surface of the wheel disposed in their paths, the wheel would not be rotated inasmuch as the power of the wind would be balanced upon the opposite sides of the vertical plane of the shaft. By providing the shield and the rudder or steering vane, these parts will act as a governor so that the wind will act properly upon the wheel to impart motion thereto, and it will be understood that, if the rudder be manually shifted so as to turn the shield 29 into the direct path of the wind, the wind wheel will remain at rest.

It is to be particularly noted that the blades of the wheel present concave faces to the wind both vertically and horizontally, and this formation of the blades tends to, in effect, form pockets which will prolong the action of the air currents upon the blades so that the blades will move with the wind smoothly and easily and will not be subjected to a jerky irregular movement, as is the case when a mere deflecting impact force is imparted thereto. Moreover, the openings through the outer portions of the several blades provide reduced vents through which the wind may flow and the pressure of the wind acting through these openings of small diameter creates a suction through the blades which aids in turning the wheel. A very considerable portion of the wind striking the blades is deflected inwardly to act on the blades at that portion of the wheel which is behind the shield. This deflected portion of the wind tends to form eddies which would interfere with the successful operation. These eddying currents would be trappped in the wheel if the shield extended uninterruptedly around half the circumference of the wheel, but I avoid this condition by providing the extension frame 32 having openings 34 through which the deflected portion of the wind may escape, and I am also enabled by this construction to locate the vane or rudder in a diametrical plane of the free edge of the shield so that the shield will be effectually presented to the wind.

It will be noted that I have provided an exceedingly simple and compact mechanism by the use of which power for driving machinery may be very cheaply obtained, and the device is very thoroughly braced so that it will withstand the action of strong winds and is thus adapted for use in high places where the wind attains great velocity.

Having thus described the invention, I claim:

1. In a wind motor, the combination of a supporting frame, a shaft mounted vertically in the frame, a wind wheel carried by the shaft, a shield of arcuate form disposed adjacent the wheel and movably supported on the frame, an arcuate rigid frame extending from one vertical side edge of the shield and having openings therethrough, the shield and the frame being concentric with and partly housing the wheel, and a steering vane fixed to and extending vertically the full height of said frame in the same diametrical plane of the wheel as the opposite edge of the shield.

2. In a wind motor, the combination of a supporting frame, a shaft mounted vertically therein, a wind wheel carried by the shaft, an arcuate shield rotatably supported in the frame adjacent the wind wheel, an arcuate frame extending from one vertical side edge of the shield having openings therethrough, and a steering vane secured rigidly to said frame and having a member extending vertically thereof and radially to the wheel and another member disposed radially of the wheel and extending under the same.

3. In a wind motor, the combination of a supporting frame, a shaft mounted vertically therein, a plurality of disks secured to said shaft in vertically spaced relation, blades disposed between the several disks, fastening elements each inserted through one disk and the respectively subjacent disk, and other fastening elements inserted through all the disks whereby the disks and blades will be rigidly secured together.

In testimony whereof I affix my signature.

THOMAS B. PREASE. [L. S.]